(12) United States Patent
Woo et al.

(10) Patent No.: US 8,761,270 B2
(45) Date of Patent: Jun. 24, 2014

(54) APPARATUS AND METHOD FOR TRANSMITTING AND RECEIVING TIME BROADCASTING INFORMATION USING POWER LINE

(75) Inventors: Sam Yong Woo, Daejeon (KR); Young Beom Kim, Daejeon (KR); Myungsoo Kim, Daejeon (KR); Taeg Yong Kwon, Daejeon (KR); Seong Hoon Yang, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 187 days.

(21) Appl. No.: 13/388,631

(22) PCT Filed: Aug. 5, 2010

(86) PCT No.: PCT/KR2010/005157
§ 371 (c)(1),
(2), (4) Date: Feb. 6, 2012

(87) PCT Pub. No.: WO2011/016689
PCT Pub. Date: Feb. 10, 2011

(65) Prior Publication Data
US 2012/0128080 A1 May 24, 2012

(30) Foreign Application Priority Data

| Aug. 6, 2009 | (KR) | 10-2009-0072259 |
| Dec. 31, 2009 | (KR) | 10-2009-0135076 |
| Dec. 31, 2009 | (KR) | 10-2009-0135077 |
| Jan. 6, 2010 | (KR) | 10-2010-0000691 |

(51) Int. Cl.
*H04B 3/00* (2006.01)

(52) U.S. Cl.
USPC ........... 375/257; 375/259; 375/295; 375/316; 375/322

(58) Field of Classification Search
USPC ......... 375/257, 259, 268, 271, 293, 294, 295, 375/302, 316, 322, 324, 340, 34
See application file for complete search history.

(56) References Cited

U.S. PATENT DOCUMENTS

| 7,034,707 | B2 * | 4/2006 | Aisa ............................. 340/662 |
| 7,224,272 | B2 * | 5/2007 | White et al. .................. 370/419 |
| 7,761,079 | B2 * | 7/2010 | Mollenkopf et al. ......... 455/402 |
| 2003/0131156 | A1 * | 7/2003 | Aizu et al. ........................ 710/1 |
| 2005/0110650 | A1 * | 5/2005 | Haines ..................... 340/825.52 |
| 2008/0157938 | A1 * | 7/2008 | Sutardja ................... 340/310.11 |
| 2009/0187358 | A1 * | 7/2009 | Deaver, Sr. ..................... 702/58 |
| 2011/0055296 | A1 * | 3/2011 | Shimazaki et al. ........... 707/822 |
| 2011/0258063 | A1 * | 10/2011 | Arakawa ..................... 705/26.1 |

FOREIGN PATENT DOCUMENTS

| JP | 2004-150892 | 5/2004 |
| JP | 2007-101306 | 4/2007 |
| JP | 2009230679 A | * 10/2009 |
| KR | 10-1999-0048430 | 5/1999 |
| KR | 10-0622221 | 8/2006 |
| WO | WO 2012005492 | * 1/2012 |

* cited by examiner

*Primary Examiner* — Hirdepal Singh
(74) *Attorney, Agent, or Firm* — Allen, Dyer, Doppelt, Milbrath & Gilchrist, P.A.

(57) ABSTRACT

In the present invention, time information is sent through a common power line in executing home automation devices or using various industrial equipments. In the power line broadcasting, a small amount of data, such as time information, is transmitted unidirectionally, and long-distance power line broadcasting can be possible using carriers of a low frequency band. time setting for various instruments is automatically performed in response to a power signal after a breakdown of electric current, making unnecessary a user's action to perform the time setting, and the existing power line can be used without change.

6 Claims, 9 Drawing Sheets

| Start | LOW FREQUENCY GROUP (Hz) | HIGH FREQUENCY GROUP (Hz) |
|---|---|---|
| 1 | 697 | 1209 |
| 2 | 697 | 1336 |
| 3 | 697 | 1447 |
| 4 | 770 | 1209 |
| 5 | 770 | 1336 |
| 6 | 770 | 1447 |
| 7 | 852 | 1209 |
| 8 | 852 | 1336 |
| 9 | 852 | 1447 |
| 0 | 941 | 1209 |
| * | 941 | 1336 |
| # | 941 | 1447 |

APPARATUS AND METHOD FOR TRANSMITTING AND RECEIVING TIME BROADCASTING INFORMATION USING POWER LINE

TECHNICAL FIELD

The present invention relates to an apparatus and method for transmitting and receiving time broadcasting information using a power line. More particularly, the present invention relates to an apparatus and method for transmitting and receiving time broadcasting information using a power line for transferring time broadcasting information, in which accurate time information can be conveniently transferred in such a manner that the time broadcasting information loaded on a low frequency is broadcasted and received to and by many and unspecified persons through the power line.

BACKGROUND ART

<Communication and Broadcasting>

Communication is a term collectively referring to an action of transmitting, receiving, and exchanging information, such as symbols, audio, and video, between two points or between two more points. Among other things, Power Line Communication (PLC) is a technique for loading voice and data on a power signal and communicating the voice and data through a power line for supplying electric power.

As a concept contrasted with communication, there is broadcasting. The term broadcasting means that several pieces of information, such as entertainments, information, and education, are propagated to many and unspecified persons who have adequate receiving devices so that they can see or hear the several pieces of information at the same time.

An invention to be disclosed in the present invention can be defined as Power Line Broadcasting (PLB) in that a small amount of data is transmitted unidirectionally and received by many and unspecified persons. Among other things, the present invention relates to a transmission/reception apparatus and method in which time broadcasting information is loaded on the power signal of a power line and transmitted to a variety of devices, and it can be defined as Power Line Time Broadcasting (PLTB).

The power line broadcasting, unlike power line communication, enables long-distance transmission through a power line using a low frequency. It can achieve an object more effectively as compared with the existing power line communication when the object is to transfer information unidirectionally.

A concept and a technique of the above-described power line broadcasting needs to be introduction because of the following reasons inherent in the power line communication.

The power line communication (i.e., wired communication) uses a power line as a medium and thus has a possibility that it can affect other radio equipment because of the leakage of electric waves. A frequency band used to send and receive a large amount of data may be a frequency band limited by electric wave regulations in some cases.

Furthermore, the power line used in the power line communication is not a communication line composed of single equipment for a single purpose, like a telephone line or an Asymmetric Digital Subscriber Line (ADSL), but connected to various devices, such as house refrigerators, TV, and measuring equipment in Korea Electric Power. Thus, the power line used in the power line communication is inappropriate for a data communication line because of a very high noise level and the distortion or frequent disconnection of a signal.

In particular, the power line must overcome special environments, such as a high load, an interference phenomenon, shifting impedance, and a signal attenuation phenomenon, and transfer data through limited signal power.

<Necessity of Time Information Broadcasting>

Today, time is a physical quantity for the most accurate measurement. For its accuracy, time information is worthy to be sufficiently utilized in the entire industry. Therefore, to manage and accurately maintain the time information becomes important for the utilization.

Regarding the time information, standard times managed and maintained by respective countries, in addition to International Atomic Time (TAI) and Coordinated Universal Time (UTC), are broadcasted in the form of long waves. Furthermore, a reference time of an atomic clock mounted on a Global Positioning System (GPS) satellite is used as the time information.

Standard frequency broadcasting can be received by a simple shortwave and longwave radio receiver and has thus been widely used. A time frequency can be corrected at shipping, a spot where communication and electronic equipment for military communication is used, etc.

However, shortwave band signal is difficult to receive indoors because it chiefly uses a space wave, and it has a disadvantage, such as a deterioration of the reception sensitivity according to the state of an ionization layer and a place where a receiving antenna is installed.

Furthermore, a method of acquiring time information, such as standard time information, using an Internet network or a telephone network is indirect and limited to some degree in supplying the time information to various electronic products and various instruments within factory facilities and research institutes.

Accordingly, there is a need for a technique for broadcasting and sending time information using a power line, which can send the time information (e.g., radio time broadcasting and a reference time using a GPS) without additional dedicated lines and can use the existing electric equipment without change and which can be used to execute home automation devices and can be used in industry fields where various instruments or system equipment is installed and various businesses in line with national and civilian policies.

DISCLOSURE OF INVENTION

Technical Problem

Accordingly, the present invention has been made keeping in mind the above problems occurring in the prior art, and an object of the present invention is to provide a transmission/reception apparatus and method, in which time information can be transmitted through a common power line in order to execute home automation or a variety of industrial apparatuses and then utilized.

Furthermore, another object of the present invention is to provide a transmission/reception apparatus and method, in which a time information signal of a predetermined frequency band is transmitted through a power line and time acquirement means for receiving the time information signal is synchronized with time received in accordance with a synchronization scheme, thereby enabling various devices to easily acquire and utilize time.

Furthermore, yet another object of the present invention is to provide a transmission/reception apparatus and method, in which a small amount of data, such as time information, is transmitted unidirectionally and long-distance broadcasting using a power line can be performed using carriers of a low frequency band, as compared with the power line communication which requires carriers of a high frequency band in order to send a large amount of data bidirectionally.

Furthermore, further yet another object of the present invention is to provide a transmission/reception apparatus and method, in which time setting for various instruments is automatically performed in response to a power signal after a breakdown of electric current, making unnecessary a user s action to perform the time setting, and the existing power line can be used without change.

Solution to Problem

As described above, the objects of the present invention can be achieved by providing a clock using a power line, comprising a power line 110 configured to send predetermined electric power; time output means 120 configured to output a time information signal corresponding to time information; signal combination means 130 connected between the power line 110 and the time output means 120 and configured to combine the output time information signal and a power signal of the power line 110; a filter 140 connected to the end of the power line 110 and configured to extract the time information signal, having a predetermined frequency band, from the power line 110; and time acquirement means 150 connected to the filter 140 and synchronized with the time information through a predetermined synchronization scheme on the basis of the extracted time information signal.

Furthermore, it is preferred that demodulation means 141 connected between the filter 140 and the time acquirement means 150 and configured to output the time information signal from which carrier signals have been removed; decoding means 143 configured to decode the time information signal encoded; and time display means 160 configured to display the time information signal acquired through the synchronization be further included.

Meanwhile, the objects of the present invention can be achieved by providing, as another category, a method of transmitting time using a power line, comprising a step (S110) of time output means 120 outputting a time information signal so that the time information signal is combined with a power signal of the power line 110; a step (S120) of signal combination means 130, connected between the power line 110 and the time output means 120, combining the output time information signal and the power signal of the power line 110; a step (S130) of a filter 140, connected to the end of the power line 110, extracting the time information signal having a predetermined frequency band from the power line 110; and a step (S140) of time acquirement means 150 connected to the filter 140 and synchronized with the time information through a predetermined synchronization scheme on the basis of the extracted time information signal.

Furthermore, it is preferred that the synchronization step (S140) of the time acquirement means 150 include a step (S142) of the time acquirement means 150 receiving a start signal for synchronization in synchronization with the start of a time code included in the time information signal and a step (S144) of the time acquirement means 150 receiving a time code for time synchronization at a certain interval.

Furthermore, it is preferred that a step (S150) of the time display means 160 displaying the time information acquired through the synchronization be further included.

Meanwhile, the objects of the present invention can be achieved by providing an apparatus for transmitting time broadcasting information using a power line, comprising a power line 210 for sending a predetermined power signal; broadcasting signal generation means 220 for generating a time broadcasting signal by encoding at least one time broadcasting information of a year, a month, a day, an hour, a minute, and a second; modulation means 230 for generating a modulation signal by modulating the time broadcasting signal into carriers; and broadcasting signal combination means 240 for combining the modulation signal and the power signal.

Meanwhile, the objects of the present invention can be achieved by providing an apparatus for receiving time broadcasting information using a power line, comprising a filter 250 for extracting a modulation signal, combined with a predetermined power signal, from a power line 210 for sending the power signal; demodulation means 270 for demodulating a time broadcasting signal from the modulation signal; and broadcasting information acquirement means 280 for acquiring at least one time broadcasting information of a year, a month, a day, an hour, a minute, and a second by decoding the demodulated time broadcasting signal.

Meanwhile, the objects of the present invention can be achieved by providing, as yet another category, a method of transmitting time broadcasting information using a power line, comprising a step (S210) of broadcasting signal generation means 220 encoding at least one time broadcasting information of a year, a month, a day, an hour, a minute, and a second; a step (S220) of the broadcasting signal generation means 220 generating a time broadcasting signal on the basis of the encoded time broadcasting information; a step (S230) of modulation means 230 generating a modulation signal by modulating the time broadcasting signal into carriers; and a step (S240) of broadcasting signal combination means 240 combining the modulation signal and a power signal of the power line 210.

Meanwhile, the objects of the present invention can be achieved by providing, as further yet another category, a method of receiving time broadcasting information using a power line, comprising a step (S250) of a filter 250, connected to the power line 210, extracting a modulation signal combined with a power signal of the power line 210; a step (S260) of demodulation means 270 demodulating a time broadcasting signal from the modulation signal; a step (S270) of broadcasting information acquirement means 280 decoding encoded time broadcasting information from the demodulated time broadcasting signal; and a step (S280) of the broadcasting information acquirement means 280 acquiring the decoded time broadcasting information.

Meanwhile, the objects of the present invention can be achieved by providing an apparatus for transmitting time broadcasting information using a power line and a dual tone multi-frequency, comprising a power line 310 for transferring a predetermined power signal; broadcasting signal generation means 320 for encoding at least one time broadcasting information of a year, a month, a day, an hour, a minute, and a second, corresponding to a specific zero-crossing point of time of an AC signal which is the power signal, and generating a time broadcasting signal which is a synthesis signal of different frequencies of the dual tone multi-frequency so that the time broadcasting signal corresponds to the encoded time broadcasting information; and broadcasting signal combination means 330 for combining the time broadcasting signal and the power signal.

Meanwhile, the objects of the present invention can be achieved by providing an apparatus for receiving time broadcasting information using a power line and a dual tone multi-frequency, comprising filtering means 350 connected to the power line 310 and configured to extract a time broadcasting signal which is a synthesis signal of different frequencies of the dual tone multi-frequency from the power line 310 and to separate the different frequencies into individual frequencies and broadcasting information acquirement means 360 configured to acquire decoded time broadcasting information by decoding the time broadcasting information on the basis of a combination of the separated individual frequencies.

Meanwhile, the objects of the present invention can be achieved by providing, as further yet another category, a method of transmitting time broadcasting information using a power line and a dual tone multi-frequency, comprising a step (S310) of broadcasting signal generation means 320 encoding at least one time broadcasting information of a year, a month, a day, an hour, a minute, and a second; a step (S320) of the broadcasting signal generation means 320 generating a time broadcasting signal which is a synthesis signal of different frequencies of the dual tone multi-frequency so that the time broadcasting signal corresponds to the encoded time broadcasting information; and a step (S330) of broadcasting signal combination means 330 combining the time broadcasting signal and a power signal of the power line 310.

Meanwhile, the objects of the present invention can be achieved by providing a method of receiving time broadcasting information using a power line and a dual tone multi-frequency, comprising a step (S350) of filtering means 350, connected to the power line 310, extracting a time broadcasting signal which is a synthesis signal of different frequencies of the dual tone multi-frequency from the power line 310; a step (S353) of the filtering means 350 separating the different frequencies of the time broadcasting signal into individual frequencies; a step (S360) of broadcasting information acquirement means 360 decoding time broadcasting information on the basis of a combination of the separated individual frequencies; and a step (S370) of the broadcasting information acquirement means 360 acquiring the decoded time broadcasting information.

Meanwhile, the objects of the present invention can be achieved by providing an apparatus for transmitting time broadcasting information using a power line and a Frequency Shift Keying (FSK) modulation method for a dual tone frequency signal, comprising a power line 410 for transferring a predetermined power signal; broadcasting signal generation means 420 for receiving at least one time broadcasting information of a year, a month, a day, an hour, a minute, and a second, corresponding to a specific zero-crossing point of time of an AC signal which is the power signal, and encoding the received time broadcasting information into binary numbers; broadcasting signal generation means 430 for generating a time broadcasting signal by performing Frequency Shift Keying (FSK) modulation method for two different tone frequency signals so that the time broadcasting signal corresponds to the encoded time broadcasting information; and broadcasting signal combination means 440 for combining the time broadcasting signal and the power signal.

Meanwhile, the objects of the present invention can be achieved by providing, as further yet another category, an apparatus for receiving time broadcasting information using a power line and a Frequency Shift Keying (FSK) modulation method for a dual tone frequency signal, comprising a filter 450 for extracting a modulation signal, connected to a predetermined power signal and subjected to Frequency Shift Keying (FSK) modulation into two different tone frequency signals, from the power line 410 for sending the power signal; demodulation means 470 for demodulating the two different tone frequency signals from the modulation signal; and broadcasting information acquirement means 480 for acquiring at least one time broadcasting information of a year, a month, a day, an hour, a minute, and a second, corresponding to a specific zero-crossing point of time of an AC signal which is the power signal, by decoding the demodulated two different tone frequency signals.

Meanwhile, the objects of the present invention can be achieved by providing, as further yet another category, a method of transmitting time broadcasting information using a power line and a Frequency Shift Keying (FSK) modulation method for a dual tone frequency signal, comprising a step (S410) of encoding means 420 encoding at least one time broadcasting information of a year, a month, a day, an hour, a minute, and a second, corresponding to a specific zero-crossing point of time of an AC signal which is a power signal of the power line 410, into binary numbers; a step (S420) of broadcasting signal generation means 430 generating a time broadcasting signal by performing the Frequency Shift Keying (FSK) modulation method for the dual tone frequency signals so that the time broadcasting signal corresponds to the encoded time broadcasting information; and a step (S430) of broadcasting signal combination means 440 combining the generated time broadcasting signal and the power signal.

Meanwhile, the objects of the present invention can be achieved by providing, as further yet another category, a method of receiving time broadcasting information using a power line and a Frequency Shift Keying (FSK) modulation method for a dual tone frequency signal, comprising a step (S450) of a filter 450 extracting a modulation signal, connected to a predetermined power signal and subjected to Frequency Shift Keying (FSK) modulation into two different tone frequency signals, from the power line 410 for sending the power signal; a step (S460) of demodulation means 470 demodulating the two different tone frequency signals from the modulation signal; and a step (S470) of broadcasting information acquirement means 480 acquiring at least one time broadcasting information of a year, a month, a day, an hour, a minute, and a second, corresponding to a specific zero-crossing point of time of an AC signal which is the power signal, by decoding the demodulated two different tone frequency signals.

Advantageous Effects of Invention

In accordance with the preferred embodiments of the present invention, there is an advantage in that time information can be transmitted through a common power line and utilized, in executing home automation or a variety of industrial equipment.

Furthermore, there is an advantage in that a variety of devices can acquire and utilize time because a time information signal of a predetermined frequency band is transmitted through a power line and time acquirement means configured to receive the time information signal and disposed at the end of the line is synchronized with time received in accordance with a synchronization scheme.

Furthermore, there is an advantage in that a small amount of data, such as time information, is transmitted unidirectionally and long-distance broadcasting using a power line can be performed using carriers of a low frequency band, as compared with the conventional power line communication which requires carriers of a high frequency band in order to send a large amount of bidirectionally.

Furthermore, there are advantages in that time setting for various instruments is automatically performed in response to a power signal after a breakdown of electric current, making unnecessary a user s action to perform the time setting, and the existing power line can be used without change.

MODE FOR THE INVENTION

<Construction of First Embodiment>

Figure 1:
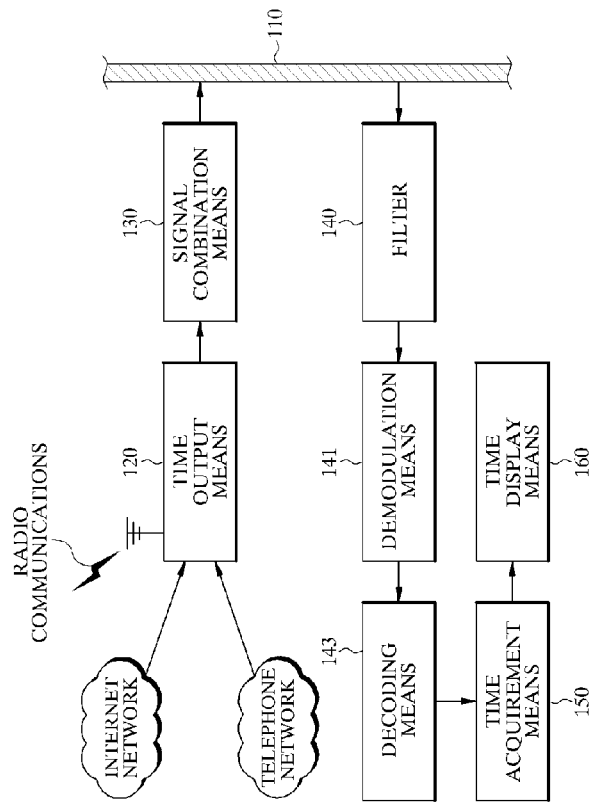
FIG. 1 shows a configuration of a clock using a power line according to a first embodiment of the present invention.

FIG. 1 shows a configuration of a clock using a power line according to a first embodiment of the present invention. As shown in FIG. 1, the power line 110 is an indispensable constituent element in Power Line Communication (PLC). Voice or various pieces of information can be loaded on a high frequency signal and then transmitted through the power line 110 without an additional LAN line or wireless communication equipment when a power source is plugged in an outlet. Since the power line 110 for supplying electric power is used as a medium, the existing power line 110 can be used without additional installation of a communication line. Furthermore, a power signal of the power line 110 used in the embodiments of the present invention is an AC signal of 50 Hz to 60 Hz and it can have voltage of 110 Vrms or 220 Vrms, but not limited thereto. The power line 110 can be a distribution line having shifting voltage and a power cable for power transmission.

Time output means 120 receives a time information signal, including time information, through wired and wireless communications and outputs it to the power line 110. The time information includes standard time (ST) information or reference time information using GPSs. The standard time information can be directly received from the cesium atomic clock of a national standards institute. Here, the time information includes not only a current standard time, such as a date, an hour, a minute, and a second, but also regional time information and international time information.

Further, the standard time information may be received through radio broadcasting using shortwave bands transmitted by a national standards institute or may be received over an Internet network (e.g. T1/E1 dedicate lines, ADSL, and HFC) or a telephone network. The time output means 120 can be installed in an apartment complex (e.g., a control office within the complex), large building, or large-scale facilities such as factories.

Signal combination means 130 functions to load the time information signal, output by the time output means 120, on the power line 110 through inductive coupling. A time information signal can be coupled with a certain point of time within one cycle of a power signal. Here, in order to minimize the distortion of a signal, it is preferred that the time information signal be coupled with the certain point of time when a signal within the power line 110 based on the power signal becomes about 0 V. However, if there is no problem in demodulation because of an excellent signal quality, the time information signal can be coupled with the certain point of time irrespective of a predetermined phase.

A filter 140 receives various signals from the power line 110 and extracts a time information signal, having a predetermined frequency band, from the signals. The filter can be formed of a bandpass filter. Here, since a power frequency of a predetermined frequency band commonly has 60 Hz, a carrier of a high frequency is used in order to distinguish the power frequency from the carrier of a high frequency. Furthermore, a predetermined frequency band should be able to be designated as a do-not-use band by allocating an appropriate frequency thereto because it is related to national standards of power line communication and further connected with international standards.

Time acquirement means 150 is connected to the filter 140 and configured to acquire time information, such as standard time information or reference time information using GPSs. Thus, the time acquirement means 150 becomes various apparatuses and systems which can utilize time information. The time acquirement means 150 can become electric home appliances, such as a refrigerator, an electric rice-cooker, a washing machine, television, and AV systems at home and a notebook computer and can become a variety of instruments and industrial devices at laboratories and factories. Furthermore, the time acquirement means 150 can become all systems which require accurate time and can be unified therewith, such as traffic lights and government and public offices. Further, the time acquirement means 150 can be used in small-, middle-, and large-sized clocks which can extract time information from the time acquirement means 150 and display the extracted time information at any place where the power line 110 is installed.

The time acquirement means 150 acquires time information in accordance with a synchronization scheme. The time acquirement means 150 receives a time information signal, including a periodic time code and a start code informing the start of a time code, in addition to time information, and it is synchronized with the time information. Of course, not only periodic synchronization, but the cycle of synchronization can be made short so that the time information can be consecutively acquired. Furthermore, the time acquirement means 150 may include an oscillator for displaying current time using its own clock when a power source is turned off.

A first example of the time acquirement means 150 can include means for calculating cumulative power in watt-hour meters (not shown) installed at each home. When time information is acquired, tele metering is performed by calculating an accurate amount of power used at an accurate time at each home.

Furthermore, a second example of the time acquirement means 150 is home automation (not shown). When time information is acquired, illumination control, crime prevention, and so on can be automatically performed at an accurate time.

Furthermore, a third example of the time acquirement means 150 can include control means (not shown) such as traffic lights. When the control means, such as traffic lights, acquires time information, the traffic lights are integrally controlled on the basis of an accurate time.

In addition, the time acquirement means 150 can include CCTV, a web camera, access control systems, a timer in an industrial field, a clock, and the control means of a VTR or a DVR. Further, the time acquirement means 150 can include reference time providing means in a sensor network based on a uniquitous network or a control industry.

Demodulation means 141 can obtain time information by removing carriers from a time information signal passed through the filter 140 in the case in which the time information signal has been modulated into a carrier frequency (e.g., a spread spectrum method or a phase modulation method). Here, a modem capable of performing modulation and demodulation is commonly used. Amplification means (not shown) may be included between the demodulation means 141 and decoding means 143 in order to amplify a demodulated and weak time information signal.

The decoding means 143 is configured to obtain time information by decoding or decrypting a time information signal in the case in which the time information signal has been encoded or encrypted in the form of a digital signal. The decoding means 143 obtains time information from a time information signal which has passed the filter 140 and the demodulation means 141. In this case, the decoding means 143 can be mounted on a variety of devices using a decoding chip (not shown) having a chip-scale size, and the decoded time information is acquired by the time acquirement means 150.

Time display means 160 can display time information, acquired by the time acquirement means 150, on a display device, such as an LCD or an LED.

*

<Method of First Embodiment>

Figure 2:
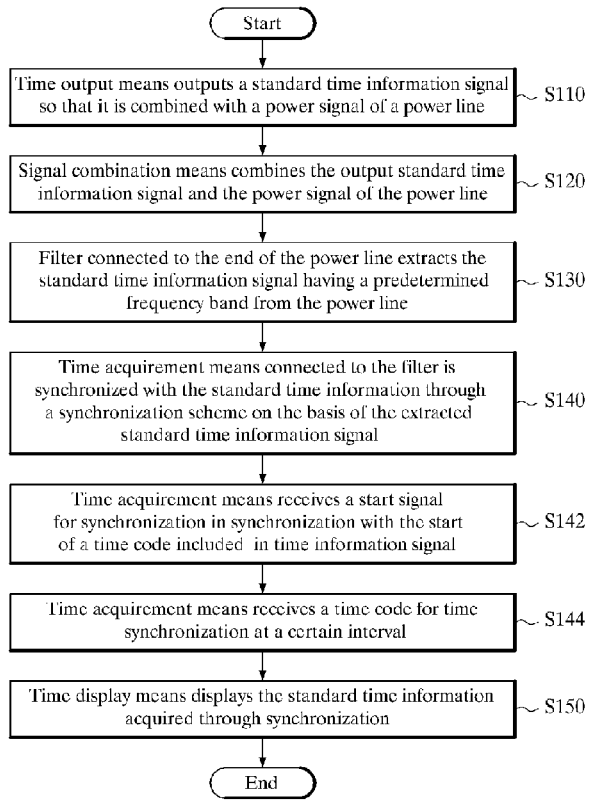
FIG. 2 is a flowchart sequentially illustrating a method of transmitting time using a power line according to a first embodiment of the present invention.

FIG. 2 is a flowchart sequentially illustrating a method of transmitting time using a power line according to a first embodiment of the present invention. As shown in FIG. 2, the time output means 120 outputs a time information signal so that it is combined with a power signal within the power line 110 at step S110. Here, the time output means 120 receives and outputs the time information through wired and wireless communications (e.g., an Internet network and a telephone network). Here, the time information can include not only a date and current time, such as hour, a minute, and a second, but also regional time information and international time information.

Next, the signal combination means 130 combines the output time information signal and the power signal within the power line 110 at step S120.

Next, the filter 140 connected to the end of the power line 110 extracts a time information signal, having a predetermined frequency band, from the power line 110 at step S130.

Next, the time acquirement means 150 connected to the filter 140 is synchronized with time information in accordance with a synchronization scheme on the basis of the extracted time information signal at step S140. Accordingly, the time information is acquired by a variety of devices, which are then operated on the basis of the acquired time information, and so that a system including the devices is unified.

Next, the time display means 160 displays the time information acquired through synchronization so that the time information can be recognized visually or aurally at step S150.

When the time information is acquired and displayed through the above process, the time information may be set to an internal clock using an internal local oscillator in order to maintain time until next time information is acquired. Furthermore, since the communication of the power line 110 is used, time may be maintained using a power signal of 60 Hz.

As shown in FIG. 2, the step (S14) of the time acquirement means 150 is performed as follows.

The time acquirement means 150 receives a start signal for synchronization in synchronization with the start of the time code included in the time information signal at step S142.

Next, the time acquirement means 150 receives the time code for time synchronization at a certain interval at step S144. In this case, the time code may be included in the time information signal at a cycle of 1 minute so that it complies with the minute unit of time or may be included in the time information signal at a cycle of 1 second so that it complies with the second unit of time. Furthermore, if a function, such as a Z-counter, is included in the time acquirement means 150, time information can be transmitted and acquired at a certain cycle and then synchronized with received time information (e.g., standard time or reference time using GPSs). Furthermore, in the case of the time code, a Binary Coded Decimal (BCD) time code decoded by the decoding means 143 is used for synchronization.

Through the above steps, the time acquirement means 150 is synchronized with the time code and so synchronized with time information.

<Construction of Second Embodiment>

Figure 3:
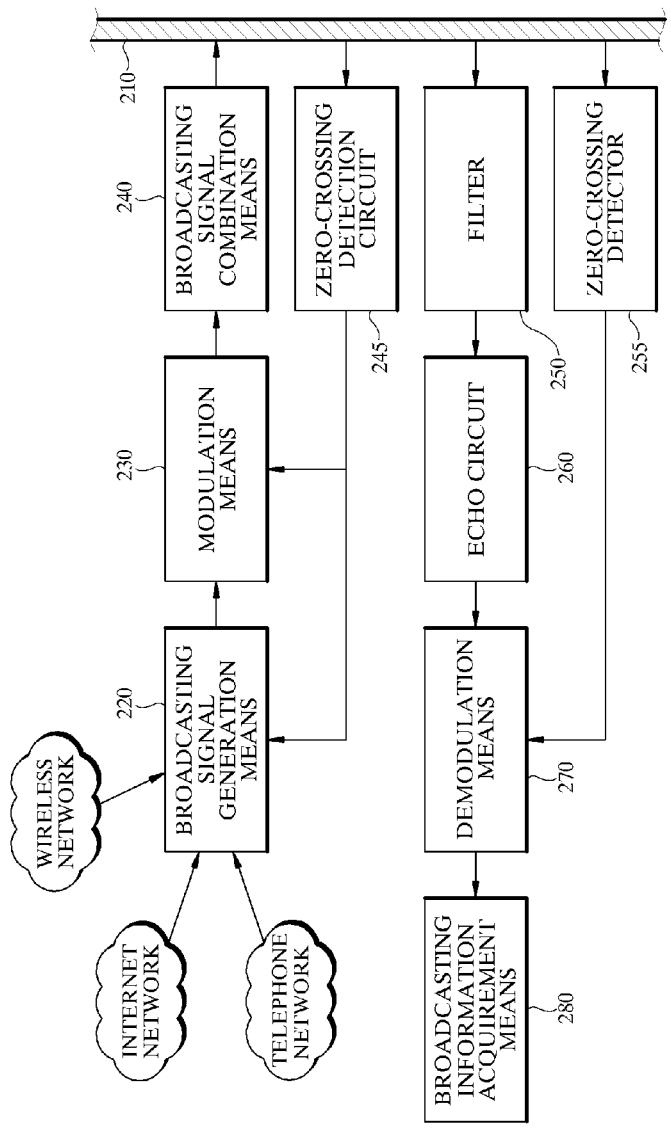
FIG. 3 shows a configuration of an apparatus for transmitting and receiving time broadcasting information using a power line according to a second embodiment of the present invention.

FIG. 3 shows a configuration of an apparatus for transmitting and receiving time broadcasting information using a power line according to a second embodiment of the present invention. As shown in FIG. 3, the apparatus for transmitting and receiving time broadcasting information using a power line according to the second embodiment of the present invention provides time broadcasting information to all measuring and instrumentation devices, connected to a power line 210 and requiring time information, by broadcasting a binary-coded decimal code through the power line 210.

The power line 210 is the same as described above and a description thereof is omitted. Broadcasting signal generation means 220 functions to generate a time broadcasting signal by encoding at least one time broadcasting information of a year, a month, a day, an hour, a minute, and a second. In particular, the broadcasting signal generation means 220 generates the time broadcasting signal by encoding time broadcasting information. In the present embodiment, the time broadcasting information is encoded into binary-coded decimal codes, an example of which is described later.

Modulation means 230 functions to generate a modulation signal by modulating the time broadcasting signal into carriers. Demodulation means 270 functions to demodulate the time broadcasting signal by removing the carriers from the modulation signal. Here, the modulation means 230 and the demodulation means 270 can be configured using a modulation and demodulation circuit (not shown) using appropriate carriers depending on a modulation and demodulation method. In particular, in the present invention, any one of modulation methods, including Frequency Shift Keying (FSK), Amplitude Shift Keying (ASK), and Phase Shift Keying (PSK) which are used to modulate and demodulate a digital signal, can be used.

Broadcasting signal combination means 240 functions to combine the modulation signal and a power signal. That is, when the modulation means 230 modulates the time broadcasting signal received from the broadcasting signal generation means 220 into the modulation signal, the broadcasting signal combination means 240 loads the modulation signal on the power line 210 through electromagnetic inductive coupling.

The broadcasting signal combination means 240 can combine the modulation signal at a certain point of time within one cycle of the power signal. Here, in order to minimize the distortion of the signal and facilitate the detection of the signal in a receiving apparatus, a moment when the power signal within the power line 210 becomes 0 V can be detected and used for modulation. Accordingly, modulation can be easily performed, and a point of time indicated by a time broadcasting signal between a broadcasting terminal and a receiving terminal can be consistent with the moment (i.e., zero crossing).

A filter 250 functions to extract the combined modulation signal from the power line 210. The modulation signal having a frequency band of several to several tens of kHz can be easily distinguished from the power signal of 60 Hz. Thus, the filter 250 can be constructed using a bandpass filter.

Furthermore, in the case in which a modulation signal is combined at the zero-crossing point of time of a power signal, a zero-crossing detection circuit 245 for detecting the zero-crossing point of time can be further included in order to extract the modulation signal at the point of time.

The demodulation means 270 is the same as described above and a description thereof is omitted. Broadcasting information acquirement means 280 corresponds to various measuring and instrumentation devices requiring time broadcasting information. The Broadcasting information acquirement means 280 can include a notebook, a traffic light, and electric home appliances. The Broadcasting information acquirement means 280 functions to acquire the time broadcasting information by decoding the demodulated time broadcasting signal.

Furthermore, the broadcasting information acquirement means 280 functions to decode the time broadcasting signal. In an embodiment of the present invention, the broadcasting information acquirement means 280 decodes time broadcasting information encoded into binary-coded decimal codes and resultantly acquires at least one time broadcasting information of a second, a minute, an hour, a day, a month, and a year. It is preferred that the time broadcasting information basically include a second, a minute, an hour, and a day. Furthermore, the broadcasting information acquirement means 280 can maintain time using the 60 Hz AC signal of the power line 210 even without using additional internal clock generating means.

An echo circuit 260 functions to repeatedly output the extracted modulation signal in the form of the same pattern so that the pattern of the extracted modulation signal can be distinguished from a variety of noise signals received therewith and easily analyzed.

The method of encoding and modulating time broadcasting information in the present invention can be various. The encoding method can be changed according to the contents of time broadcasting information to be broadcasted. Furthermore, any one of modulation methods, including Frequency Shift Keying (FSK), Amplitude Shift Keying (ASK), and Phase Shift Keying (PSK), can be used as the modulation method. Hereinafter, an embodiment of the FSK modulation method for binary-coded decimal codes used in the present invention, together with an example of binary-coded decimal codes transmitted through conventional wireless communication, is described.

Figure 4:
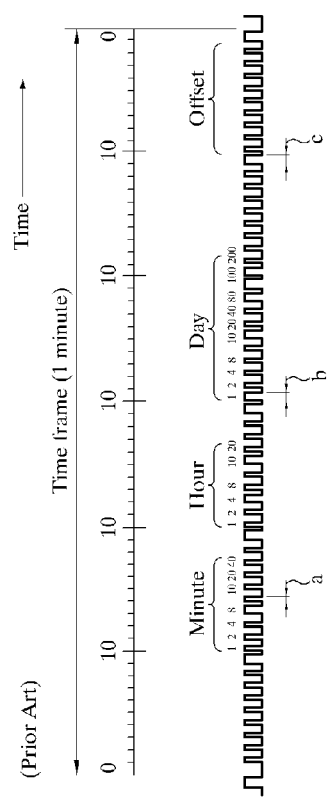
FIG. 4 is a diagram showing an example of binary-coded decimal codes of a standard frequency station which is a propagation method according to time frequency standards using conventional wireless communication.

FIG. 4 is a diagram showing an example of binary-coded decimal codes of a standard frequency station which is a propagation method according to time frequency standards using conventional wireless communication. As shown in FIG. 4, in the method of propagating time frequency standards using the conventional wireless communication, time information, such as a minute, an hour, and a day, is transmitted using the entire time frame as 1 minute.

More particularly, a 4-bit binary-coded decimal code, used to adjust the length of 100 Hz signal modulation in each signal per second, is consecutively transmitted one bit by one bit per second. Here, a pulse transmitted at this time is transmitted for 200 ms indicated by 'a' in the case of '0' and for 500 ms indicated by 'b' in the case of '1' For the synchronization of the pulse, a pulse for location recognition is inserted between the pulses for 800 ms indicated by 'c' for every 10 seconds.

Figure 5:
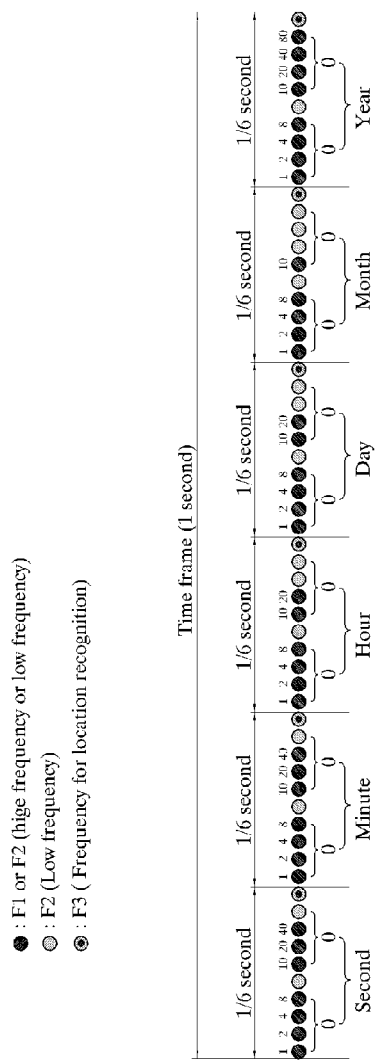
FIG. 5 is a diagram illustrating the Frequency Shift Keying (FSK) modulation method for binary-coded decimal codes according to a second embodiment of the present invention.

FIG. 5 is a diagram illustrating the Frequency Shift Keying (FSK) modulation method for binary-coded decimal codes according to a second embodiment of the present invention. As shown in FIG. 5, time broadcasting information of a second, a minute, an hour, a day, a month, and a year can be encoded for every ⅙ seconds using a time frame as 1 second and represented by an FSK modulation method. In this case, a point of time at which the encoding is performed is a moment when the phase of a power signal of the power line becomes zero-crossed.

Numbers corresponding to the time broadcasting information are converted into binary numbers and encoded into 0 and 1. Here, 4 bits are allocated to each of the numbers of the time broadcasting information. Further, a pulse of a high frequency F1 and a pulse of a low frequency F2 correspond to 0 and 1, and a pulse for location recognition for synchronization is output for every ⅙ seconds. Here, a frequency distinguished from the high frequency F1 and the low frequency F2 is used as a frequency of the pulse for location recognition. The time that it takes to output each pulse can vary according to a time frame, but 1/60 second in the case of 1 second.

Meanwhile, as a first modification example of the encoding and modulation methods, up to the second, the minute, the hour, and the day of the time broadcasting information are identical with those of the Frequency Shift Keying (FSK) modulation method of FIG. 5. In some cases, a month and a year can be substituted with 365 days. In such a case, a day requires three digit numbers. Accordingly, 2 bits corresponding to a third digit number can be further allocated to the day. Furthermore, the remaining time of the time frame (i.e., 1 second) can be allocated to a signal of a low frequency so that it can be distinguished from the signal.

Furthermore, as a second modification example of the encoding and modulation methods, broadcasting only the second, the minute, the hour, and the day of the time broadcasting information is identical with that of the first modification example. However, in the case of the remaining time as a result of allocating time broadcasting information every 1/6 second, silence in which any signal is not transmitted can be added to the first 1/6 second so that signals can be clearly distinguished from each other.

<Method of Second Embodiment>

Figure 6:
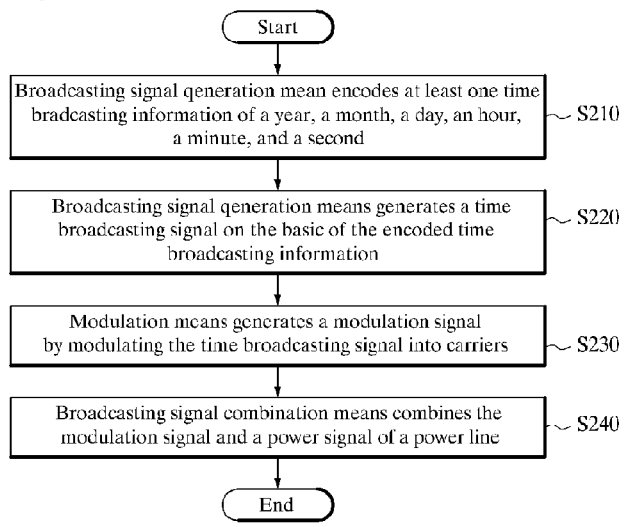
FIG. 6 is a flowchart sequentially illustrating a method of transmitting time broadcasting information using a power line according to a second embodiment of the present invention.

FIG. 6 is a flowchart sequentially illustrating a method of transmitting time broadcasting information using a power line according to a second embodiment of the present invention. The method of transmitting time broadcasting information according to the second embodiment of the present invention is described below with reference to FIG. 6. First, the broadcasting signal generation means 220 encodes at least one time broadcasting information of a year, a month, a day, an hour, a minute, and a second at step S210. The time when the encoding is performed is a moment when the phase of a power signal of the power line is zero-crossed.

Next, the broadcasting signal generation means 220 generates a time broadcasting signal on the basis of the encoded time broadcasting information at step S220.

Next, the modulation means 230 generates a modulation signal by modulating the time broadcasting signal into carriers at step S230. Furthermore, a point of time at which the bits of the modulation signal are shifted is a moment when an AC signal of the power line is zero-crossed. Meanwhile, a 4-bit binary-coded decimal code used to adjust the length of 100 Hz signal modulation in each signal per second is consecutively transmitted one bit by one bit per second. Here, a pulse transmitted at this time is transmitted for 200 ms indicated by 'a' in the case of '0' and for 500 ms indicated by 'b' in the case of '1' For the synchronization of the pulse, a pulse for location recognition is inserted between the pulses for 800 ms indicated by 'c' for every 10 seconds.

Next, the broadcasting signal combination means 240 combines the modulation signal and the power signal of the power line 210 at step S240. Accordingly, time broadcasting information is transmitted through the power line.

In particular, the step (S210) of encoding the time broadcasting information and the step (S220) of generating the time broadcasting signal can be previously programmed so that time broadcasting information received from the outside (e.g., a wireless network, a telephone network, and an Internet network) can be automatically encoded to thereby generate a time broadcasting signal.

Figure 7:
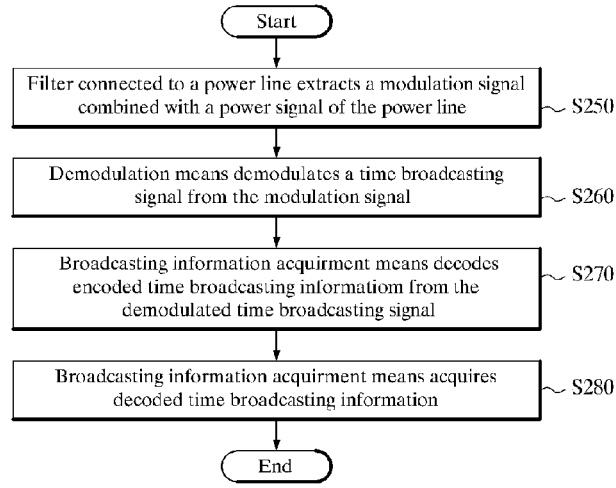
FIG. 7 is a flowchart sequentially illustrating a method of receiving time broadcasting information using a power line according to a second embodiment of the present invention.

FIG. 7 is a flowchart sequentially illustrating a method of receiving time broadcasting information using a power line according to a second embodiment of the present invention. The method of receiving time broadcasting information using the power line according to the second embodiment of the present invention is described below with reference to FIG. 7. First, the filter 250 connected to the power line 210 extracts a modulation signal combined with the power signal of the power line 210 at step S250.

Next, the echo circuit 260 repeatedly outputs the extracted modulation signal in order to facilitate pattern analysis at step S255.

Next, the demodulation means 270 demodulates a time broadcasting signal from the modulation signal at step S260. Here, the output of the zero-crossing detector 255 is used as means for bit synchronization and determining a point of time.

*Next, the broadcasting information acquirement means 280 decodes encoded time broadcasting information from the demodulated time broadcasting signal at step S270.

Next, the broadcasting information acquirement means 280 acquires the decoded time broadcasting information (step S280), thus receiving time broadcasting information from the power line.

The step (S250) of the filter 250 extracting the modulation signal can further include a process of detecting a zero-crossing point of time using a zero-crossing detection circuit (not shown). The step (S255) of the echo circuit 260 repeatedly outputting the modulation signal may be omitted if the power signal is excellent.

Furthermore, after the step (S280) of the broadcasting information acquirement means 280 acquiring the time broadcasting information, a variety of measuring and instrumentation devices (e.g., a notebook, traffic lights, and electronic products) equipped with the broadcasting information acquirement means 280 can be operated or display means (not shown) may display current time information, on the basis of accurate time broadcasting information.

<Construction of Third Embodiment>

Figure 8:
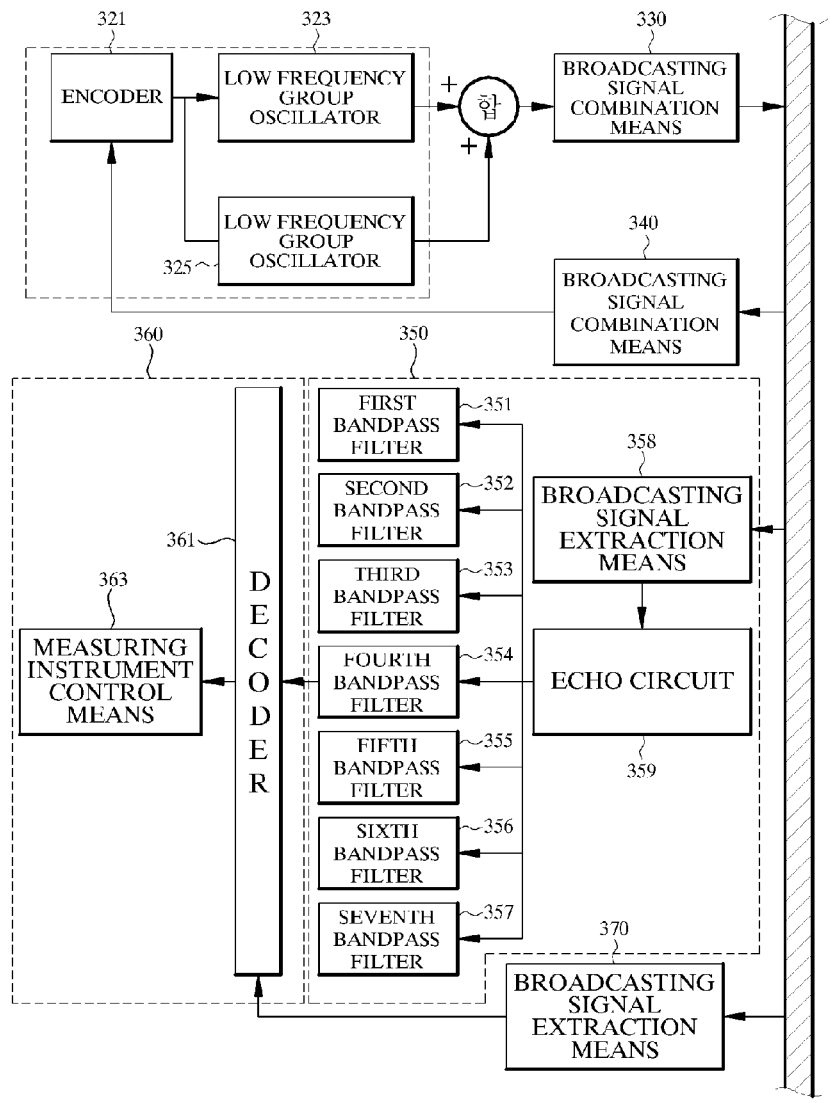
FIG. 8 shows a configuration of an apparatus for transmitting and receiving time broadcasting information using a power line and a dual tone multi-frequency according to a third embodiment of the present invention.

FIG. 8 shows a configuration of an apparatus for transmitting and receiving time broadcasting information using a power line and a dual tone multi-frequency according to a third embodiment of the present invention. As shown in FIG. 8, the apparatus for transmitting and receiving time broadcasting information using a power line and a dual tone multi-frequency provides time broadcasting information to all measuring and instrumentation devices, connected to a power line 310 and requiring time information, by broadcasting a dual tone multi-frequency time code through the power line 310.

The power line 310 and broadcasting signal generation means 320 are the same described above and a description thereof is omitted. However, the broadcasting signal generation means 320 generates a time broadcasting signal using a dual tone multi-frequency time code generated by encoding time broadcasting information into a decimal of a dual tone multi-frequency (DTMF). Here, the term 'Dual tone multi-frequency' is a method of sending 16 kinds of codes using two tones previously designated as a pair, from among 8 audible tone frequencies and is a signal method widely used in a telephone network.

In the present invention, four frequencies of a low frequency group and three frequencies of a high frequency group, set to exclude the mutual influence of harmonic signals generated by a non-linear characteristic of an AC frequency, are used. A time broadcasting signal (i.e., 12 synthesis signals) is generated through a composition of the groups.

To this end, the broadcasting signal generation means 320, as shown in FIG. 8, includes an encoder 321 for encoding various forms of external time information into dual tone multi-frequency time codes. The broadcasting signal generation means 320 is synchronized in response to a point at which an AC signal of the power line 310, received from a zero-crossing detector 340, is zero-crossed. The broadcasting signal generation means 320 further includes a low frequency group oscillator 323 for oscillating the frequency signal of a low frequency group and a high frequency group oscillator 325 for oscillating the frequency signal of a high frequency group in order to generate the encoded time broadcasting information in the form of the time broadcasting signal.

An example of a pair of frequencies, corresponding to a dual tone multi-frequency time code, and one cycle time frame of the dual tone multi-frequency time code is described later.

Broadcasting signal combination means 330 functions to combine the time broadcasting signal (i.e., a synthesis signal of the pair of frequencies) and a power signal. That is, the broadcasting signal combination means 330 loads the time broadcasting signal (i.e., the synthesis signal of the pair of frequencies output by the broadcasting signal generation means 320) on the power line 310 through electromagnetic inductive coupling.

The broadcasting signal combination means 330 can combine the time broadcasting signal at the beginning of a point of time after zero-crossing within a half cycle of the power signal and terminate the combination at the beginning of the point of time. However, if the power signal of a zero-crossing point of time is used as a synchronization signal, broadcasting time errors of time broadcasting information be minimized.

Filtering means 350 is connected to the power line 310 and configured to separate different frequencies into individual frequencies by removing the AC frequency of the power line using broadcasting signal extraction means 358 from the power line 310 and extracting the time broadcasting signal (i.e., a synthesis signal of different frequencies of the dual tone multi-frequency).

Accordingly, the filtering means 350 includes seven frequency bandpass filters 351, 352, 353, 354, 355, 356, and 357 for filtering seven frequencies, respectively. The filtering means 350 can further include an echo circuit 359 for repeatedly outputting the time broadcasting signal.

The seven frequency bandpass filters 351, 352, 353, 354, 355, 356, and 357 filter seven respective different frequencies which belong to a low frequency group and a high frequency group used in a dual tone multi-frequency. Since the respective different frequencies have frequency bands of several hundreds to several thousands of Hz (i.e., different audible frequencies), they can be easily distinguished from the power signal of 60 Hz. Further, the seven frequencies can also be easily distinguished from each other because they have different intensities of frequency signals passing through the respective bandpass filters.

A zero-crossing detector 370 detects the zero-crossing point of time of the power signal so that the time broadcasting signal can be easily extracted in the case in which the time broadcasting signal is combined at the zero-crossing point of time of the power signal.

Furthermore, the echo circuit 359 repeatedly outputs the extracted time broadcasting signal so that a variety of noise signals extracted together with the time broadcasting signal can be distinguished from the time broadcasting signal and pattern analysis can be easily performed.

Broadcasting information acquirement means 360 acquires broadcasting information by decoding the time broadcasting information on the basis of a combination of the individual frequencies filtered by the filtering means 350. Accordingly, the broadcasting information acquirement means 360 includes a decoder 361 for decoding the individual frequencies into a dual tone multi-frequency time code corresponding to a combination of a pair of frequencies. In this case, an accurate point of time indicated by the decoded time information is received from the zero-crossing detector 370.

Furthermore, the broadcasting information acquirement means 360 can include measuring instrument control means 363 for directly acquiring time broadcasting information which is used as standard time for control. Here, the measuring instrument control means 363 is only illustrative, and it can include the control means of all electronic devices requiring time broadcasting information, such as a variety of measuring and instrumentation devices, a notebook, traffic lights, and electric home appliances. The broadcasting information acquirement means 360 may further include time display means for displaying time information.

The broadcasting information acquirement means 360 acquires at least one time broadcasting information of a second, a minute, an hour, a day, a month, and a year by decoding the time broadcasting signal into decimal time broadcasting information using the decoder 361. It is preferred that the time broadcasting information basically includes a second, a minute, an hour, and a day. Furthermore, the broadcasting information acquirement means 360 can maintain time using the AC signal of 60 Hz of the power line 310 even without using additional internal clock generating means.

Meanwhile, the present invention relates to the broadcasting of time broadcasting information through a power line using a dual tone multi-frequency. Accordingly, the encoding of time broadcasting information and the generation of a time broadcasting signal are basically performed using a dual tone multi-frequency method. That is, a dual tone multi-frequency is encoded into one decimal number corresponding to a combination of a pair of frequencies, and the pair of frequencies is synthesized or modulated, thereby generating the time broadcasting signal.

Figures 9, 10:
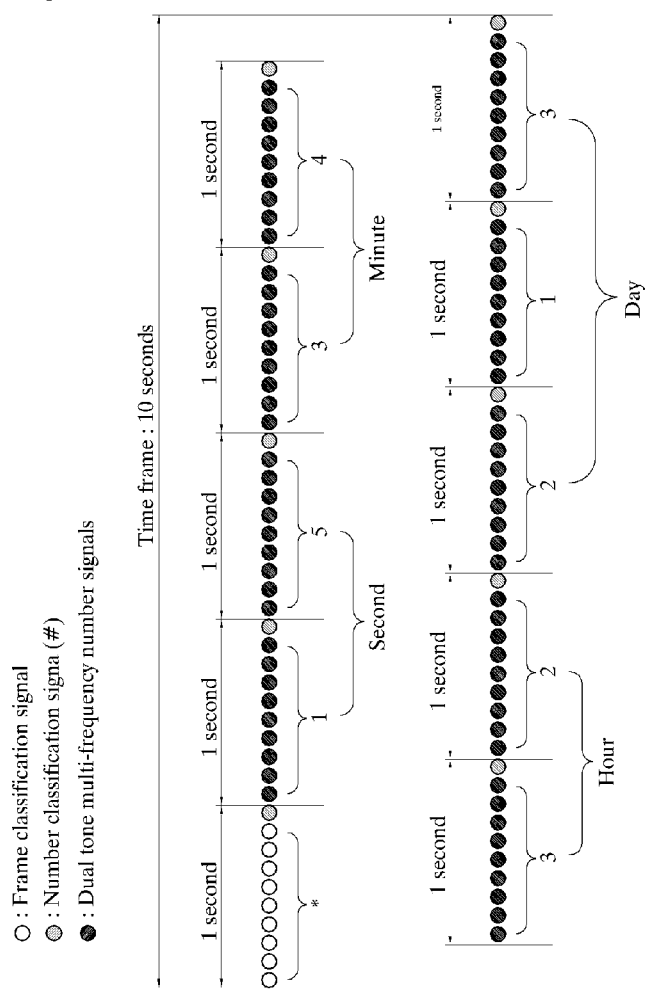
FIG. 9 is a diagram showing frequency synthesis pairs corresponding to the numbers of dual tone multi-frequencies which are time broadcasting signals according to a third embodiment of the present invention.
FIG. 10 is a diagram showing a 10-second time frame which is a dual tone multi-frequency time code used to generate a time broadcasting signal according to a third embodiment of the present invention.

FIG. 9 is a diagram showing frequency synthesis pairs corresponding to the numbers of dual tone multi-frequencies which are time broadcasting signals according to a third embodiment of the present invention. As shown in FIG. 9, frequency groups used in the present invention include a low frequency group of four frequencies 697 Hz, 770 Hz, 852 Hz, and 941 Hz and a high frequency group of three frequencies 1209 Hz, 1336 Hz, and 1447 Hz. The seven frequencies are combined, leading to 12 codes. That is, dual tone multi-frequency numbers from 0 to 9, *, and # can be represented by a combination of frequencies. Here, * and # can be used as the classification signals of time broadcasting information to be described later.

FIG. 10 is a diagram showing a 10-second time frame which is a dual tone multi-frequency time code used to generate a time broadcasting signal according to a third embodiment of the present invention. As shown in FIG. 10, in the case in which time broadcasting information is a second, a minute, an hour, and a day, a time frame in which the time broadcasting information is updated at a cycle of 10 seconds can be configured. The time frame can be composed of a frame classification signal *, dual tone multi-frequency number signals 0 to 9, and a number classification signal #.

The time frame of FIG. 10 includes time broadcasting information 312 days 23 hour 43 minutes 51 seconds. Here, each of the frame classification signal and the dual tone multi-frequency number signal is output during 0.9 second. The number classification signal is output for 0.1 second every second. Further, since the time frame is a 10-second cycle, a next time frame of time broadcasting information is 312 days 23 hour 44 minutes 01 second. It is to be noted that the time frame of the 10-second interval is only an example of a dual tone multi-frequency time code and can be represented in a different way.

<Method of Third Embodiment>

Figure 11:
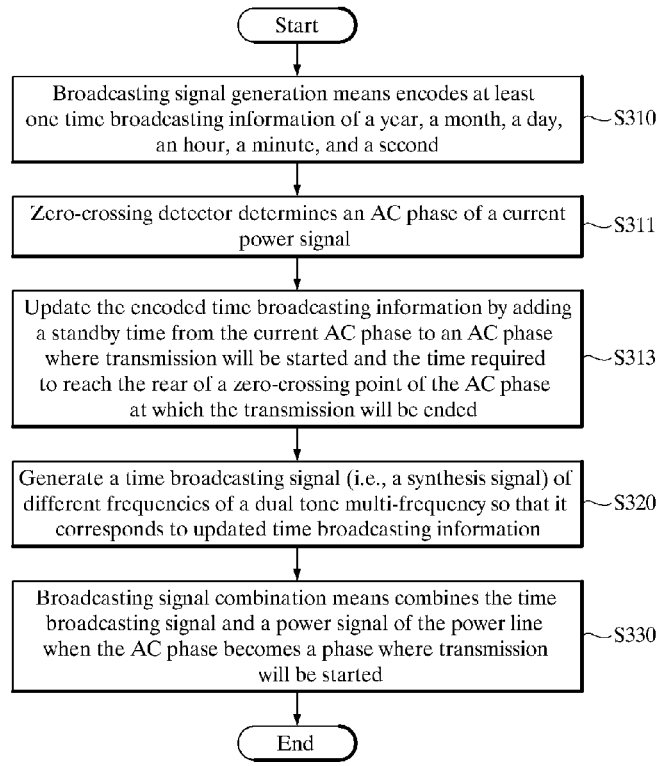
FIG. 11 is a flowchart sequentially illustrating a method of transmitting time broadcasting information using a power line and a dual tone multi-frequency according to a third embodiment of the present invention.

FIG. 11 is a flowchart sequentially illustrating a method of transmitting time broadcasting information using a power line and a dual tone multi-frequency according to a third embodiment of the present invention. The third embodiment of the present invention is described below with reference to FIG. 11. First, the broadcasting signal generation means 320 encodes at least one time broadcasting information of a year, a month, a day, an hour, a minute, and a second at step S310.

Next, the zero-crossing detector 340 determines the AC phase of a current power signal at step S311. Next, the encoded time broadcasting information is updated by adding a standby time from the current AC phase to an AC phase where transmission will be started and the time required to reach the rear of a zero-crossing point of the AC phase at which the transmission will be ended at step S313.

Next, the broadcasting signal generation means 320 generates a time broadcasting signal which is a synthesis signal of different frequencies having a dual tone multi-frequency so that the time broadcasting signal corresponds to the updated time broadcasting information at step S320.

Next, the broadcasting signal combination means 330 combines the time broadcasting signal and a power signal of the power line 310 at the beginning of an AC phase of the power line 310 at step S330. As described above, the method of transmitting time broadcasting information through a power line using a dual tone multi-frequency is performed. In this case, the length of a tone is controlled so that the termination of transmission is also performed at the beginning of an AC half-cycle phase. Through such control, a point of time indicated by broadcasting information can be accurately determined even though severe delay and dispersion exist when a tone is transmitted in an environment in which impedance is irregular, such as in a power line.

Here, the encoded time broadcasting information is a decimal dual tone multi-frequency time code, and the synthesis signal of different frequencies is a synthesis signal between groups of individual frequencies, belonging to a low frequency group, including frequencies of 697 Hz, 770 Hz, 852 Hz, and 941 Hz, and a high frequency group, including frequencies of 1209 Hz, 1336 Hz, and 1447 Hz.

Furthermore, the time broadcasting signal can be composed of a time frame in which time broadcasting information is periodically updated. The time frame includes a frame classification signal *, dual tone multi-frequency number signals 0 to 9, and a number classification signal #.

Furthermore, the step (S330) of the broadcasting signal combination means 330 combining the time broadcasting signal can be a step of detecting a zero-crossing point of time at which the power signal is 0 V, combining the time broadcasting signal at an appropriate AC phase (the beginning of a half-cycle phase), and performing termination.

Figure 12:
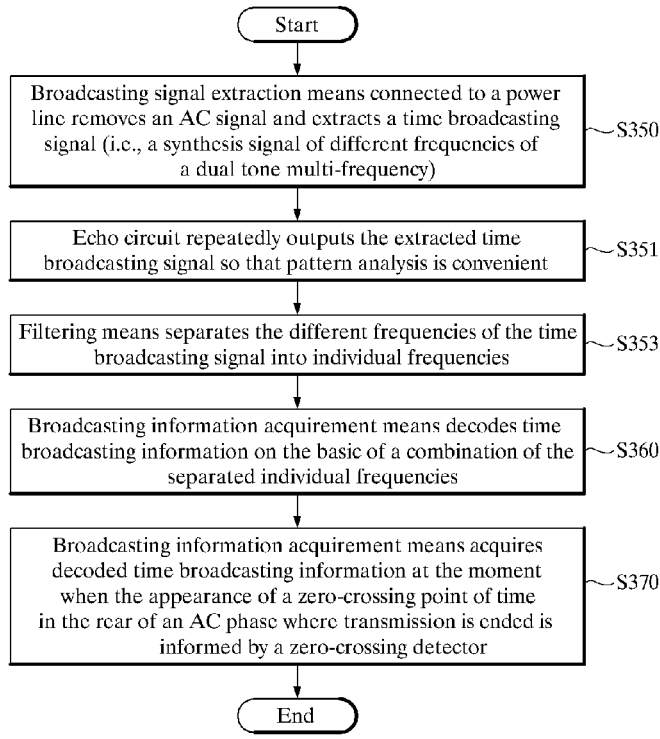
FIG. 12 is a flowchart sequentially illustrating a method of receiving time broadcasting information using a power line and a dual tone multi-frequency according to a third embodiment of the present invention.

Meanwhile, FIG. 12 is a flowchart sequentially illustrating a method of receiving time broadcasting information using a power line and a dual tone multi-frequency according to a third embodiment of the present invention. The method of receiving time broadcasting information using a power line and a dual tone multi-frequency according to the third embodiment of the present invention is described below with reference to FIG. 12. First, the filtering means 350 connected to the power line 310 extracts a time broadcasting signal (i.e., a synthesis signal of different frequencies of a dual tone multi-frequency) from the power line 310 at step S350.

Next, the filtering means 350 separates different frequencies of the time broadcasting signal into individual frequencies at step S353.

Next, the broadcasting information acquirement means 360 decodes time broadcasting information on the basis of a combination of the separated individual frequencies at step S360.

Next, the broadcasting information acquirement means 360 acquires decoded time broadcasting information at step S370. As described above, the method of receiving time broadcasting information through the power line using a dual tone multi-frequency is performed.

In the step (S350) of the filtering means 350 extracting the time broadcasting signal, after receiving the time broadcasting signal, the zero-crossing detector 370 determines a point of time, indicated by the received time information, by detecting a zero-crossing point of time at which a first power signal is a point of time of 0 V. The detection of the zero-crossing point of time and the determination of the point of time provide very useful flexibility in the improvement, extension, etc. of reception sensitivity of a broadcasting network because a point of time indicated by a transmitted symbol is a first zero-crossing point after transmission is terminated although a data frame and a tone transmission time length used by a broadcasting terminal in order to transmit time information are randomly configured and changed.

Furthermore, a step (S351) of the echo circuit 359 repeatedly outputting the extracted time broadcasting signal so that pattern analysis is convenient can be further included between the step (S350) of the filtering means 350 extracting the time broadcasting signal and the step (S353) of the filtering means 350 separating the different frequencies into the individual frequencies. Furthermore, in some cases, a point of time at which the time broadcasting signal is output can be received from the zero-crossing detector 370 in order to output more accurate time information.

<Construction of Fourth Embodiment>

Figure 13:
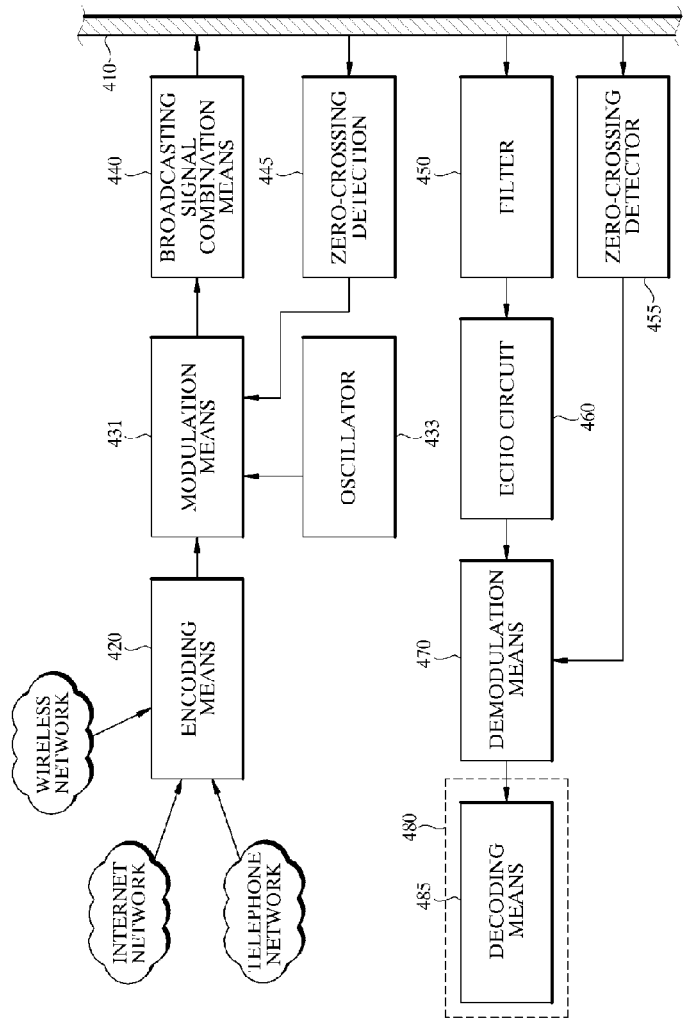
FIG. 13 shows a configuration of an apparatus for transmitting and receiving time broadcasting information using a power line and the Frequency Shift Keying (FSK) modulation method for a dual tone frequency signal according to a fourth embodiment of the present invention.

FIG. 13 shows a configuration of an apparatus for transmitting and receiving time broadcasting information using a power line and a Frequency Shift Keying (FSK) modulation method for a dual tone frequency signal according to a fourth embodiment of the present invention. As shown in FIG. 13, the apparatus for transmitting and receiving time broadcasting information using a power line and a Frequency Shift Keying (FSK) modulation method for a dual tone frequency signal according to the fourth embodiment of the present invention includes a power line 410, a power line broadcasting transmission apparatus including encoding means 420, broadcasting signal generation means 430, and broadcasting signal combination means 440, and a power line broadcasting reception apparatus including a filter 450, demodulation means 470, and broadcasting information acquirement means 480. Furthermore, zero-crossing detectors 445 and 455 can be included in the respective transmission and reception apparatus. Here, the broadcasting signal generation means 430 includes an oscillator 433 and modulation means 431. The broadcasting information acquirement means 480 includes decoding means 485.

The embodiment of the present invention is described in short. The encoding means 420 encodes time broadcasting information into binary numbers, and the broadcasting signal generation means 430 generates a time broadcasting signal (i.e., a modulation signal) by performing a Frequency Shift Keying (FSK) modulation method for a dual tone frequency signal corresponding to the encoded time broadcasting information. Next, the broadcasting signal combination means 440 combines the time broadcasting signal and a power signal of the power line 410 so that power line broadcasting is performed.

In the power line broadcasting reception apparatus, when the filter 450 extracts the modulation signal, composed of the two tone frequency signals, by removing an AC signal (i.e., the power signal), the demodulation means 470 demodulates the extracted modulation signal into the two tone frequency signals. Next, the broadcasting signal acquirement means 480 acquires time broadcasting information by decoding the two tone frequency signals using the decoding means 485. Accordingly, the acquired time broadcasting information can be provided to all measuring and instrumentation devices requiring time information.

The power line 410 is the same as described above and a description thereof is omitted. The encoding means 420 functions to encode at least one time broadcasting information of a year, a month, a day, an hour, a minute, and a second into binary numbers.

The broadcasting signal generation means 430 functions to generate a time broadcasting signal corresponding to the encoded time broadcasting information. The broadcasting signal generation means 430 can include the oscillator 433 and the modulation means 431. The oscillator 433 generates two tone frequency signals corresponding to 0 and 1 of the encoded time broadcasting information. The modulation means 431 generates the time broadcasting signal by performing a Frequency Shift Keying (FSK) modulation method for the two tone frequency signals so that the time broadcasting signal corresponds to the time broadcasting information.

Furthermore, the modulation means 431 of the broadcasting signal generation means 430, as shown in FIG. 13, is provided with a zero-crossing point of time of the AC signal of the power line 410, received from the zero-crossing detector 445, and synchronized therewith so that time broadcasting information can be utilized as accurate broadcasting information in a receiving apparatus which receives the time broadcasting information. Accordingly, a time broadcasting signal can be combined with a power signal at a specific point of time on the basis of a zero-crossing point of time of the AC signal (i.e., the power signal). Accordingly, the receiving apparatus receiving the time broadcasting information can know what the time broadcasting information is for which point of time by detecting the zero-crossing point of time.

The broadcasting signal combination means 440 functions to combine the time broadcasting signal (i.e., the modulation signal) and the power signal of the power line. That is, the broadcasting signal combination means 440 loads the time broadcasting signal, received from the broadcasting signal generation means 430, on the power line 410 through electromagnetic inductive coupling.

The time broadcasting signal combined by the broadcasting signal combination means 440 is the modulation signal modulated into two tone frequency signals. Assuming that one tone frequency signal, in general, has the tone duration of 50 ms to 410 ms, the one tone frequency signal can continue for several cycles in the case in which the tone frequency signal is loaded on a power signal having a frequency of 60 Hz.

Accordingly, in long-distance time broadcasting information transmission, easy data detection (or easy data demodulation) can be maintained in a receiving apparatus because of a long duration of the same signal, and a point of time at which data are transited can be accurately determined. Further, a zero-crossing point of time is detected in order to reduce error upon transmission, and combination is performed with an AC phase before and after the zero-crossing using the detected zero-crossing point of time as a standard point of time. The zero-crossing detector 445 for detecting the zero-crossing point of time is added and synchronized with the modulation means 431, as described above.

Here, the duration of the tone frequency signal can be changed through simple manipulation. After zero-crossing within a half cycle of one power signal of an AC signal (i.e., a power signal), the time broadcasting signal can be combined at the beginning of a point of time and the combination can be terminated. Furthermore, the power signal of the zero-crossing point of time can be used as a synchronization signal in order to minimize errors in the broadcasting time of time broadcasting information.

The filter 450 is connected to the power signal of the power line 410 for transmitting the power signal and configured to extract the modulation signal modulated the two different tone frequency signals through a Frequency Shift Keying (FSK) modulation method. The power signal is distinguished from the two tone frequency signals because it, in general, has a low frequency band of 60 Hz. Accordingly, the filter 450 includes a highpass filter or a power line AC frequency canceller in order to remove the power signal.

The demodulation means 470 functions to demodulate the modulation signal into the two tone frequency signals. The demodulation means 470 demodulates the modulation signal in which the two tone frequency signals are mixed together into binarized digital signals respectively corresponding to the two tone frequency signals.

Here, the demodulation means 470 receives an accurate point of time of time broadcasting information in synchronization with the zero-crossing detector 455. Since the time broadcasting information is modulated and combined before and after a specific zero-crossing point of time of the power signal, information about a point of time needs to be provided to the time broadcasting information in addition to data, such as the time broadcasting information.

The broadcasting information acquirement means 480 functions to acquire at least one time broadcasting information of a year, a month, a day, an hour, a minute, and a second, corresponding to the specific zero-crossing point of time of the AC signal (i.e., the power signal), by decoding the demodulated two tone frequency signals. To this end, the broadcasting information acquirement means 480 includes the decoding means 485 for decoding the binarized time broadcasting information. The broadcasting information acquirement means 480 can further include measuring instrument control means (not shown), such as measuring and instrumentation devices utilizing time broadcasting information. In this case, the accurate point of time indicated by the decoded time broadcasting information becomes the specific zero-crossing point of time detected by the zero-crossing detector 455.

Furthermore, the measuring instrument control means which can be included in the broadcasting information acquirement means 480 directly acquires time broadcasting information and uses it as standard time for control.

Furthermore, the broadcasting information acquirement means 480 can maintain time even without using additional internal clock generating means because it can use the 60 Hz AC signal of the power line 410.

An echo circuit 460 repeatedly outputs the extracted time broadcasting signal so that a variety of noise signals, extracted together with the time broadcasting signal and received from the filter 450, can be easily distinguished from the time broadcasting signal and pattern analysis can be easily performed.

Figure 14:
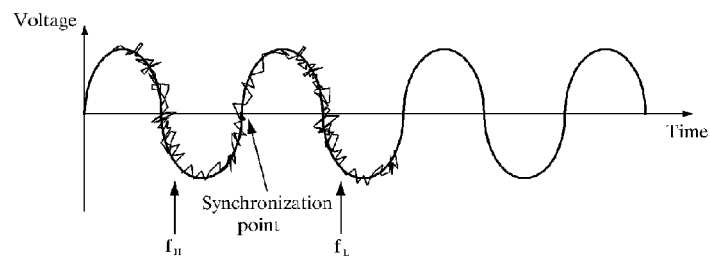
FIG. 14 is a graph showing a state in which a time broadcasting signal is combined with the AC signal of a power signal according to a fourth embodiment of the present invention.

FIG. 14 is a graph showing a state in which a time broadcasting signal is combined with the AC signal of a power signal according to a fourth embodiment of the present invention. In FIG. 14, a horizontal axis is a time axis, a vertical axis is the intensity axis of a voltage signal, and a sine wave shown in FIG. 14 is a power signal having an AC phase.

As shown in FIG. 14, two tone frequency signals $f_H$ and $f_L$, are combined with the power signal before and after a specific zero-crossing point of time (i.e., a point of time of 0 V of the power signal). As described above, in general, the duration of one tone frequency signal occupies 3 to 5 cycles of the power signal and thus generates errors in time information. However, the duration can be controlled through manipulation. Furthermore, the time information error can be reduced by providing a receiving apparatus with information about a point of time of time broadcasting information using the zero-crossing point of time as a synchronization point.

Figure 15:
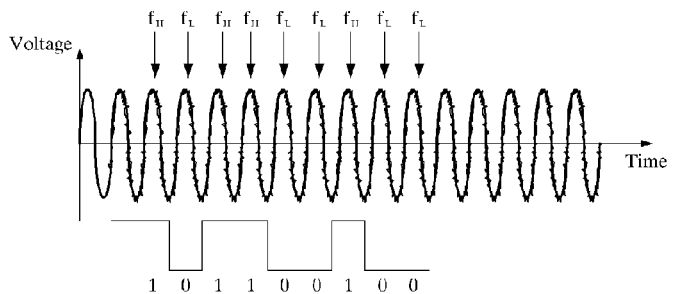
FIG. 15 is a graph showing a time broadcasting signal combined with the AC signal of a power signal and a graph showing encoded time broadcasting information corresponding thereto according to a fourth embodiment of the present invention.

FIG. 15 is a graph showing a time broadcasting signal combined with the AC signal of a power signal and a graph showing encoded time broadcasting information corresponding thereto according to a fourth embodiment of the present invention. In FIG. 15, a horizontal axis is a time axis, a vertical axis is the intensity axis of a voltage signal, and a sine wave shown in FIG. 15 is a power signal having an AC phase. As shown in FIG. 15, $f_H$ corresponds to 1 of a binary number, and $f_L$ corresponds to 0 of a binary number.

Accordingly, a series of such information of a bit unit are received and utilized as time broadcasting information, and accurate time broadcasting information is acquired using a specific zero-crossing point of time as a synchronization point.

<Method of Fourth Embodiment>

Figure 16:
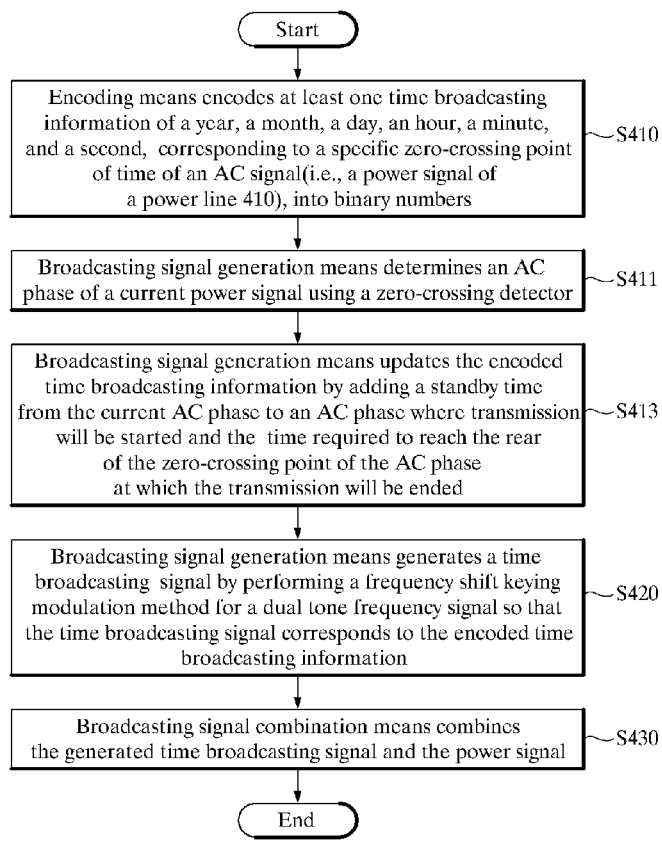
FIG. 16 is a flowchart sequentially illustrating a method of transmitting time broadcasting information using a power line and the Frequency Shift Keying (FSK) modulation method for a dual tone frequency signal according to a fourth embodiment of the present invention.

FIG. 16 is a flowchart sequentially illustrating a method of transmitting time broadcasting information using a power line and a Frequency Shift Keying (FSK) modulation method for a dual tone frequency signal according to a fourth embodiment of the present invention. Referring to FIG. 16, first, the encoding means 420 encodes at least one time broadcasting information of a year, a month, a day, an hour, a minute, and a second, corresponding to a specific zero-crossing point of time of an AC signal (i.e., the power signal of the power line 410) into binary numbers at step S410.

Next, the broadcasting signal generation means 430 determines an AC phase of a current power signal using the zero-crossing detector 445 at step S411. Next, the broadcasting signal generation means 430 updates the encoded time broadcasting information by adding a standby time from the current AC phase to an AC phase where transmission will be started and the time required to reach the rear of the zero-crossing point of the AC phase at which the transmission will be ended at step S413.

Next, the broadcasting signal generation means 430 generates a time broadcasting signal by performing a Frequency Shift Keying (FSK) modulation method for a dual tone frequency signal so that the time broadcasting signal corresponds to the encoded time broadcasting information at step S420.

Next, the broadcasting signal combination means 440 combines the generated time broadcasting signal and the power signal at step S430. Accordingly, the power line broadcasting transmission method of time broadcasting information through a Frequency Shift Keying (FSK) modulation method for a dual tone frequency signal is performed.

In this case, the length of the tone can be controlled so that the transmission is terminated at the beginning of an AC half-cycle phase. Through such control, a point of time indicated by broadcasting information can be accurately determined even though severe delay and dispersion exist when a tone is transmitted in an environment in which impedance is irregular, such as in a power line.

Figure 17:
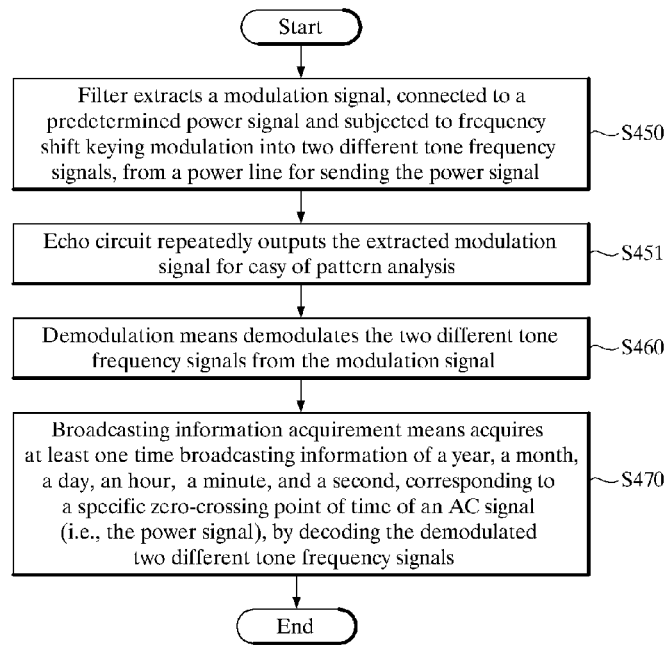
FIG. 17 is a flowchart sequentially illustrating a method of receiving time broadcasting information using a power line and the Frequency Shift Keying (FSK) modulation method for a dual tone frequency signal according to a fourth embodiment of the present invention.

Meanwhile, FIG. 17 is a flowchart sequentially illustrating a method of receiving time broadcasting information using a power line and a Frequency Shift Keying (FSK) modulation method for a dual tone frequency signal according to a fourth embodiment of the present invention. Referring to FIG. 17, first, the filter 450 is connected to a power signal transmitted by the power line 410. The filter 450 extracts a modulation signal modulated into two different tone frequency signals through the Frequency Shift Keying (FSK) modulation method at step S450.

Next, the echo circuit 460 repeatedly outputs the extracted modulation signal in order to facilitate pattern analysis at step S451.

Next, the demodulation means 470 demodulates the modulation signal into the two tone frequency signals at step S460.

Next, the broadcasting information acquirement means 480 acquires at least one time broadcasting information of a year, a month, a day, an hour, a minute, and a second, corresponding to a specific zero-crossing point of time of an AC signal (i.e., the power signal), by decoding the demodulated two tone frequency signals at step S470. Accordingly, the power line broadcasting reception method of time broadcasting information through the Frequency Shift Keying (FSK) modulation method for a dual tone frequency signal is performed.

In the step (S470) of the broadcasting information acquirement means 480 acquiring the time broadcasting information, when the demodulation means 470 demodulates the modulation signal into time broadcasting information of a specific zero-crossing point of time on the basis of a zero-crossing point of time (i.e., a point of time of 0 V of the power signal) detected by the zero-crossing detector 455, the broadcasting information acquirement means 480 acquires the time broadcasting information.

The detection of the zero-crossing point of time and the determination of the point of time provide very useful flexibility in the improvement, extension, etc. of reception sensitivity of a broadcasting network because a point of time indicated by a transmitted symbol (i.e., time broadcasting information) is a first zero-crossing point after transmission is terminated although a data frame and a tone transmission time (or a tone duration) length used by a broadcasting terminal in order to transmit time information are randomly configured and changed.

The invention claimed is:

1. An apparatus for transmitting time broadcasting information using a power line and a dual tone multi-frequency, the apparatus comprising:
   a power line for transferring a predetermined power signal;
   broadcasting signal generation means for encoding at least one time broadcasting information of a year, a month, a day, an hour, a minute, and a second, corresponding to a specific zero-crossing point of time of an AC signal which is the power signal, and generating a time broadcasting signal which is a synthesis signal of different frequencies of the dual tone multi-frequency so that the time broadcasting signal corresponds to the encoded time broadcasting information; and
   broadcasting signal combination means for combining the time broadcasting signal and the power signal.

2. The apparatus according to claim 1, wherein the broadcasting signal generation means comprises an encoder for encoding the time broadcasting information.

3. An apparatus for receiving time broadcasting information using a power line and a dual tone multi-frequency, the apparatus comprising:

filtering means connected to the power line and configured to extract a time broadcasting signal which is a synthesis signal of different frequencies of the dual tone multi-frequency from the power line and to separate the different frequencies into individual frequencies; and broadcasting information acquirement means configured to acquire decoded time broadcasting information by decoding the time broadcasting information on a basis of a combination of the separated individual frequencies.

4. The apparatus according to claim 3, wherein the broadcasting information acquirement means comprises a decoder for decoding the time broadcasting information.

5. A method of transmitting time broadcasting information using a power line and a dual tone multi-frequency, the method comprising:

- a step of broadcasting signal generation means encoding at least one time broadcasting information of a year, a month, a day, an hour, a minute, and a second;
- a step of the broadcasting signal generation means generating a time broadcasting signal which is a synthesis signal of different frequencies of the dual tone multi-frequency so that the time broadcasting signal corresponds to the encoded time broadcasting information; and
- a step of broadcasting signal combination means combining the time broadcasting signal and a power signal of the power line.

6. A method of receiving time broadcasting information using a power line and a dual tone multi-frequency, the method comprising:

- a step of filtering means, connected to the power line, extracting a time broadcasting signal which is a synthesis signal of different frequencies of the dual tone multi-frequency from the power line;
- a step of the filtering means separating the different frequencies of the time broadcasting signal into individual frequencies;
- a step of broadcasting information acquirement means decoding time broadcasting information on a basis of a combination of the separated individual frequencies; and
- a step of the broadcasting information acquirement means acquiring the decoded time broadcasting information.

* * * * *